United States Patent
Khim (10) Patent No.: US 11,032,340 B2
(45) Date of Patent: Jun. 8, 2021

(54) USING CAMERA ON COMPUTER SIMULATION CONTROLLER

(71) Applicant: Sony Interactive Entertainment LLC, San Mateo, CA (US)

(72) Inventor: Jeansoo Khim, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 16/375,085

(22) Filed: Apr. 4, 2019

(65) Prior Publication Data

US 2020/0322405 A1 Oct. 8, 2020

(51) Int. Cl.
*H04L 29/06* (2006.01)
*G09G 5/00* (2006.01)
*A63F 13/235* (2014.01)
*A63F 13/35* (2014.01)

(52) U.S. Cl.
CPC ........ *H04L 65/4092* (2013.01); *A63F 13/235* (2014.09); *A63F 13/35* (2014.09); *G09G 5/006* (2013.01); *H04L 67/38* (2013.01); *A63F 2300/1031* (2013.01); *A63F 2300/53* (2013.01); *A63F 2300/8082* (2013.01); *G09G 2320/0666* (2013.01); *G09G 2370/022* (2013.01); *G09G 2370/16* (2013.01)

(58) Field of Classification Search
CPC .... H04L 65/4092; H04L 67/38; A63F 13/235; A63F 13/35; A63F 2300/8082; A63F 2300/1031; A63F 2300/53; G09G 5/006; G09G 2320/0666; G09G 2370/022; G09G 2370/16
See application file for complete search history.

(56) References Cited

U.S. PATENT DOCUMENTS

| 2002/0142843 | A1 | 10/2002 | Roelofs | |
|---|---|---|---|---|
| 2003/0057884 | A1 | 3/2003 | Dowling et al. | |
| 2012/0075435 | A1* | 3/2012 | Hovanky | H04N 13/257 348/51 |
| 2012/0198531 | A1* | 8/2012 | Ort | H04W 12/06 726/7 |
| 2014/0043485 | A1 | 2/2014 | Bateman et al. | |
| 2014/0105561 | A1* | 4/2014 | Chen | H04L 65/1093 386/200 |
| 2014/0179426 | A1* | 6/2014 | Perry | A63F 13/12 463/31 |
| 2015/0095933 | A1* | 4/2015 | Blackburn | H04N 7/141 725/25 |
| 2015/0194126 | A1* | 7/2015 | Lee | H04N 21/4122 345/2.3 |
| 2016/0095074 | A1 | 3/2016 | Park et al. | |
| 2016/0139720 | A1 | 5/2016 | Kritt et al. | |
| 2017/0048613 | A1 | 2/2017 | Smus et al. | |
| 2017/0078635 | A1* | 3/2017 | Sorkine Hornung | H04N 9/73 |
| 2017/0142201 | A1* | 5/2017 | Holmes | A63F 13/215 |

(Continued)

*Primary Examiner* — Umar Cheema
*Assistant Examiner* — James Ross Hollister
(74) *Attorney, Agent, or Firm* — John L. Rogitz (57) ABSTRACT

A computer simulation controller includes a camera that can be used to image a display on which a computer simulation, controlled by the controller, can be presented. The camera images information on the display, such as display identification (ID), and sends the information to a server streaming the simulation. Based on the information, the server knows to which display to stream the simulation.

20 Claims, 5 Drawing Sheets

(56) References Cited

U.S. PATENT DOCUMENTS

| | | | |
|---|---|---|---|
| 2017/0182957 A1* | 6/2017 | Watson | G08C 17/02 |
| 2017/0315772 A1* | 11/2017 | Lee | G06T 7/74 |
| 2018/0288382 A1* | 10/2018 | Kring | H04N 5/57 |
| 2018/0309833 A1* | 10/2018 | Mohapatra | G06F 3/167 |
| 2019/0090028 A1 | 3/2019 | Kirley | |
| 2019/0091563 A1* | 3/2019 | Correa | A63F 13/211 |
| 2019/0321732 A1* | 10/2019 | Zimring | A63F 13/355 |
| 2020/0139231 A1* | 5/2020 | Colenbrander | H04N 21/63 |
| 2020/0169321 A1* | 5/2020 | Yamamoto | H04M 1/7253 |
| 2020/0280761 A1* | 9/2020 | Staples | G06T 7/246 |

* cited by examiner

USING CAMERA ON COMPUTER SIMULATION CONTROLLER

FIELD

The application relates to the use of cameras on computer simulation controllers.

BACKGROUND

Video simulation such as video gaming is growing in popularity. As understood herein, simulations increasingly are played by streamlining the simulations from one or more servers over the Internet.

SUMMARY

As also understood herein, it would be convenient for a user to easily switch display screens on which a streamed simulation is being played with a controller using attributes of the controller to communicate directly with the server streamlining the simulation, so that display screens can be controller-agnostic and the controller used for credentialing the user to the server as well as for display screen selection.

Accordingly, a system includes at least one computer storage that is not a transitory signal and that in turn includes instructions executable by at least one processor to receive at least one image from a camera of a simulation controller. The image is of at least a portion of a display device (DD) and indicates an identification (ID) of the DD. The instructions are executable to send the image to a simulation server on a communication path that does not include the DD. The communication path typically is at least in part wireless. The instructions are executable to send user credentials stored in the controller to the simulation server, with the server streaming, based on the ID of the DD received from the simulation controller, a simulation to the DD for presentation thereof under control of the simulation controller responsive to the credentials being valid.

The processor and computer storage can be implemented by the simulation controller.

In examples, the simulation controller communicates with the simulation via a wireless access point (AP) or router or a 5G controller.

In non-limiting examples, the instructions can be executable to provide the simulation server with color information from the simulation controller usable by the simulation server to adjust a color characteristic of the simulation. In non-limiting examples, the instructions can be executable to provide the simulation server with latency information from the simulation controller usable by the simulation server to adjust a delay of the simulation.

In another aspect, a system includes at least one computer simulation controller configured to wirelessly communicate with a network portal, at least one simulation server configured to communicate with the simulation controller through the network portal, and at least one display device configured to receive at least one computer simulation from the simulation server along with control signals from the simulation server generated by the simulation controller and provided to the simulation server through the network portal. The system also includes at least one camera on the simulation controller to image information on the display device indicating at least an identification (ID) of the display device, and the simulation controller sends the ID to the simulation server.

In another aspect, a method includes imaging a display on which a computer simulation, controlled by a simulation controller, is presentable. The method includes sending a result of the imaging to a server streaming the simulation via a network portal, and receiving, in response to the sending, the simulation for play thereof on the display. The method also includes controlling the display using the simulation controller by sending commands input to the simulation to the server via the network portal.

The details of the present application, both as to its structure and operation, can best be understood in reference to the accompanying drawings, in which like reference numerals refer to like parts, and in which:

DETAILED DESCRIPTION

This disclosure relates generally to computer ecosystems including aspects of consumer electronics (CE) device networks such as but not limited to computer simulation networks such as computer game networks. A system herein may include server and client components, connected over a network such that data may be exchanged between the client and server components. The client components may include one or more computing devices including game consoles such as Sony PlayStation® or a game console made by Microsoft or Nintendo or other manufacturer virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

The functions and methods described below, when implemented in software, can be written in an appropriate language such as but not limited to Java, C # or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Figure 1:
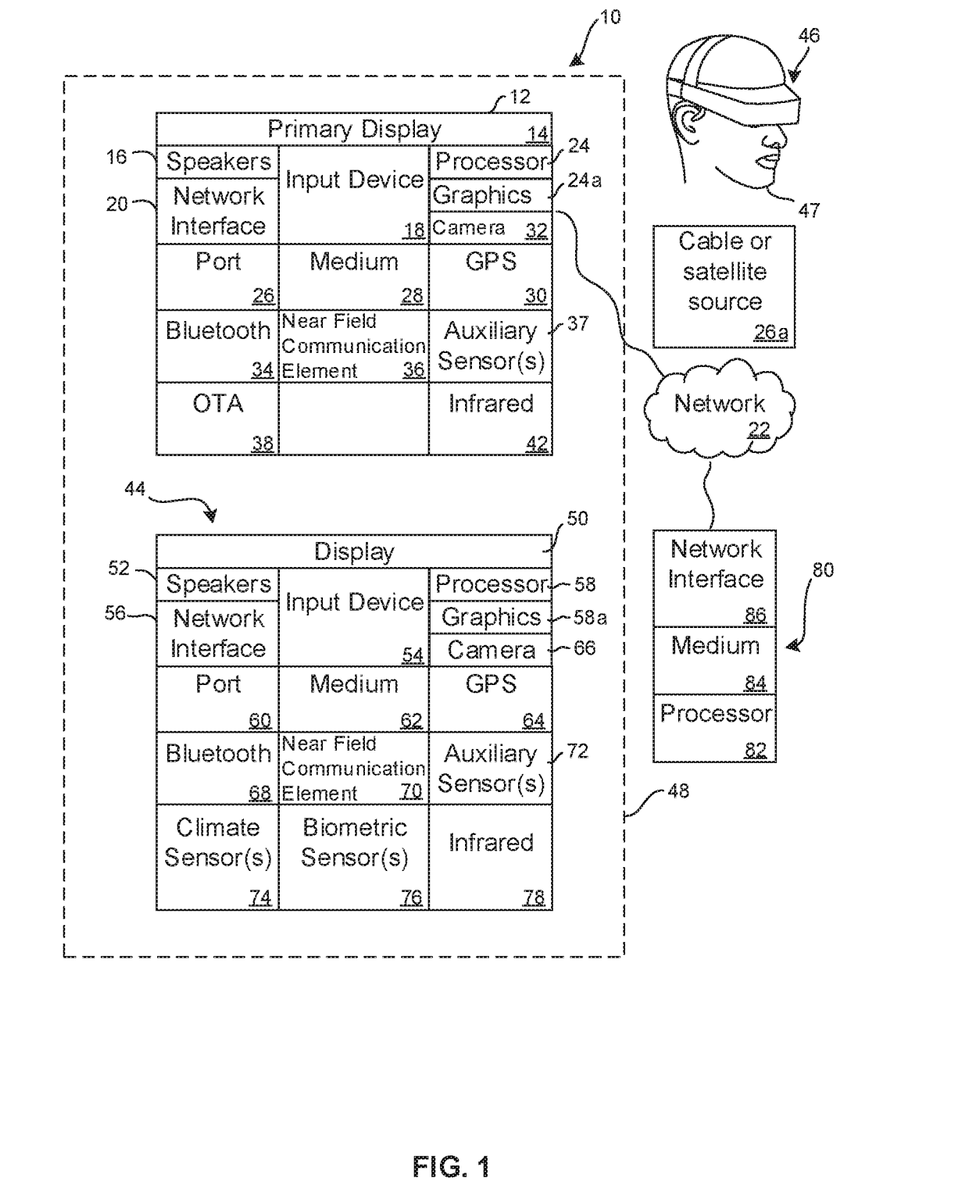
FIG. 1 is a block diagram of an example system including an example in accordance with present principles.

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content such as computer game software and databases. The source 26a when implemented as a game console may include some or all of the components described below in relation to the CE device 44.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, UPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Any of the cameras described herein may employ the high spectrum camera example or multiple examples described further below.

Also included on the AVD 12 may be a Bluetooth transceiver 34 and other Near Field Communication (NFC) element 36 for communication with other devices using Bluetooth and/or NEC technology, respectively. An example NFC element can be a radio frequency identification (RFID) element. Zigbee also may be used.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as a VR headset worn by a player 47 as shown, or a hand-held game controller manipulated by the player 47. In the example shown, only two CE devices 44, 46 are shown, it being understood that fewer or greater devices may be used.

In the example shown, to illustrate present principles all three devices 12, 44, 46 are assumed to be members of an entertainment network in, e.g., a home, or at least to be present in proximity to each other in a location such as a house. However, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller (also referred to as "console"), and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. A graphics processor 58A may also be included. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFD) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid-state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server or an entire server "farm" and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a hard disk drive, CD ROM or Flash drive. The software code instructions may also be downloaded over the Internet.

Figure 2:
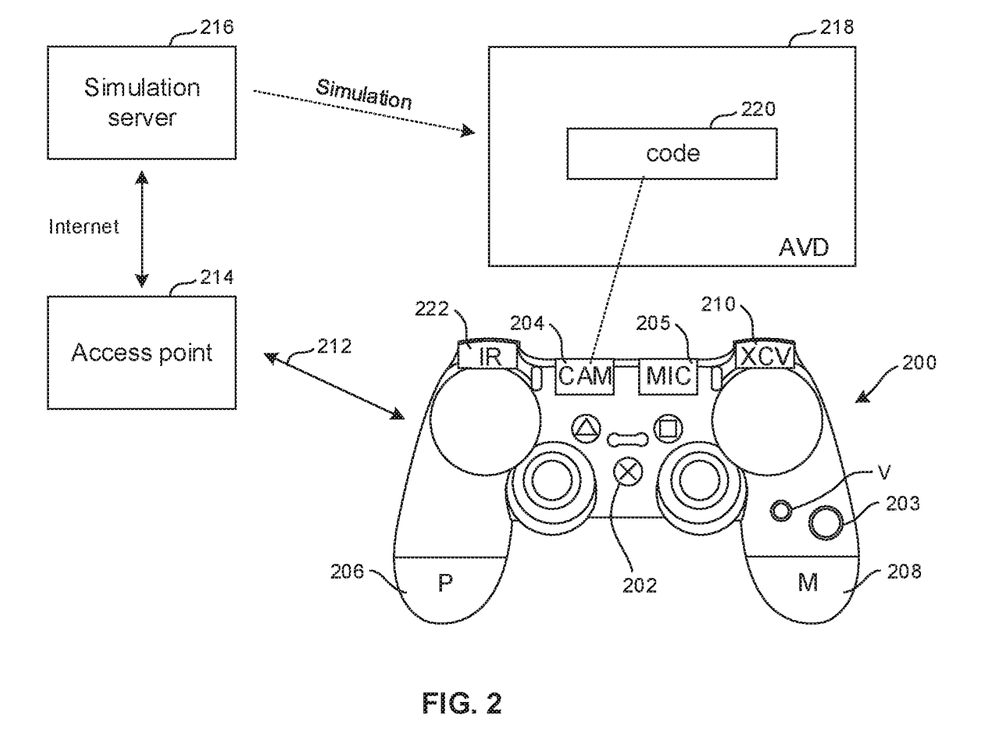
FIG. 2 is a schematic diagram of an example simulation system consistent with present principles.

FIG. 2 illustrates a wireless simulation controller 200 such as a computer game controller with plural control elements 202 such as keys, rocker elements, and the like. The controller may include a headphone jack 203 with volume control buttons V that can control audio volume level of the audio played back on the headphone jack and/or on the AVD and/or on the simulation server, to improve the user experience.

In the example shown, one or more cameras 204 are on the controller 200 (and if desired, one or more microphones 205) to communicate image signals (and audio signals from the microphone) to one or more processors 206 accessing instructions and data on one or more computer memories 208. The processor 206 can communicate, using one or more wireless transceivers 210 such as a Wi-Fi transceiver, 5G transceiver, Bluetooth transceiver, or wireless telephony transceiver or combinations thereof along a wireless link 212 with a network portal 214 such as a router, a 5G controller, or an Access Point (AP). Through the network portal 214 the controller 200 communicates with one or more simulation servers 216 on a wide area network such as the Internet, for purposes to be shortly disclosed. The controller 200 may be associated with its own network address and thus be directly addressable by the server 216, and may also store, e.g., on the memory 208, user credentials input to the controller 200 by any appropriate means, e.g., by manipulation of the control elements 202 or via Bluetooth from a wireless communication device or other technique.

The controller 200 is programmed to receive simulation commands generated by manipulation of the control elements 202 and send signals representing those commands to the server 216. In turn, the server 216 streams, under control of the commands input to the controller 200, one or more computer simulations such as computer games to one or more audio video devices (AVD) 218 such as an Internet-enabled TV with its own network address. Information 220 indicating the identification of the AVD, which may include or be correlated with a network address of the AVD, may be presented on the display of the AVD as shown, e.g., in the form of a bar code or quick response (QR) code or other text or symbol representation, for imaging by the camera 204 of the controller 200.

Also, the controller may include an infrared (IR) transceiver 222 other transceiver that can communicate with the AVD, so that the controller acts as a remote controller for the AVD powering on the capable device and launching an application, controlling volume level, etc.

Figure 3:
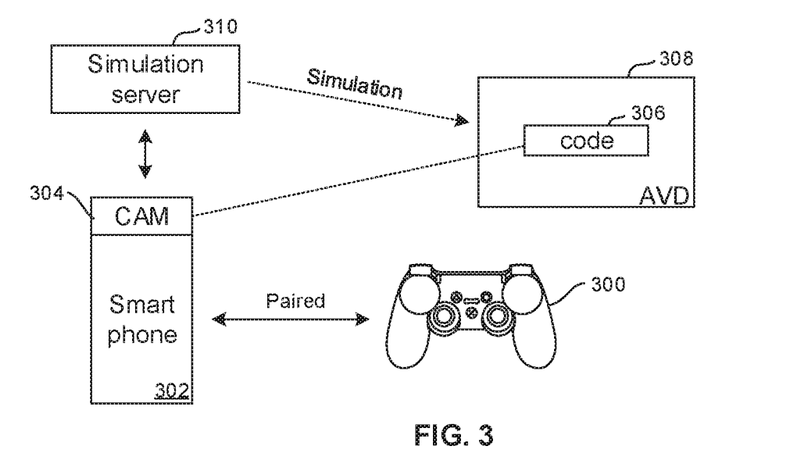
FIG. 3 is a schematic diagram of an alternate example simulation system consistent with present principles.

FIG. 3 illustrates an alternate system in which a controller 300 without a camera may be paired, e.g., via Bluetooth with a wireless communication device 302 that has a camera 304 for imaging the identification information 308 on an AVD 308, with the wireless communication device 302 sending controller commands and information 306 to a simulation server 310 for controlling the streamlining of a simulation to the AVD 308.

The devices in FIGS. 2 and 3 may incorporate some or all of the various components shown in FIG. 1 and described above. In FIGS. 2 and 3, the AVDs can be game-controller-agnostic, which makes the integration of present principles simple in that the AVD is only being used as a dummy-streaming-display. The camera 202 on the controller 200 makes the process even simpler as divulged below.

Figure 4:
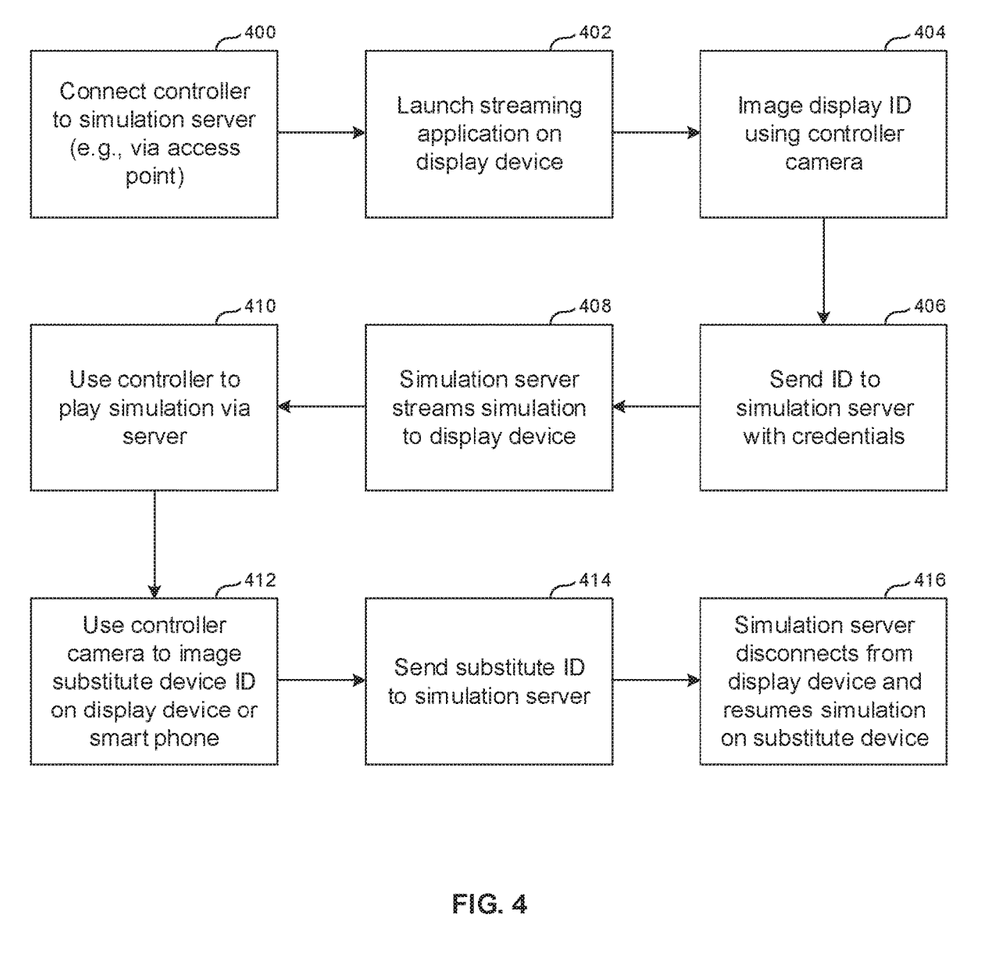
FIG. 4 is a flow chart of example logic consistent with present principles for using a wireless simulation controller to establish a display screen to which a simulation server streams a simulation.

Prior to describing FIG. 4, present principles recognize that simulation streamlining from a network server implicates latency challenges. From user's perspective, the latency may be thought of as the delay from input to the game controller to an observed reaction on screen to the input. More rigorously, without present principles Total Latency=(Game controller processing latency)+(Game controller to TV application connection latency)+(TV uplink processing latency)+(TV to streaming server connection latency)+(Streaming server processing latency)+(Streaming server to TV connection latency)+(TV display processing latency). However, because present principles provide a game controller which has a low latency network (e.g., Wi-Fi) connection which will enable the controller to communicate directly with the streaming server, the overall total latency is reduced.

FIG. 4 illustrates example logic consistent with present principles. For purposes of disclosure, assume that a user of the controller 200 whose credentials have been input to the controller goes to a friend's place at which an AVD such as the AVD 200 is implemented by a "smart TV" or "PC computer" or "Tablet computer" or large LED billboard screen. At block 400, the controller is connected to a simulation server via, e.g., Wi-Fi with internet access. At this point, an instance of the streaming server is reserved for the user.

Moving to block 402, the user launches a game streaming app on screen, or the app is pre-loaded on the screen of the AVD. Proceeding to block 404, under control of the app the AVD presents the information 220, which is imaged by the camera 204 of the controller 200 (or in the embodiment of FIG. 3, the camera 304 of the assistant device 302). The user can manipulate a key on the controller 200 to activate the camera to pair the screen with the instance of streaming server as follows. The captured information 220 is sent to the simulation server at block 406 along with the user credentials to permit play of the simulation. At this point, the server streams, at block 408, the simulation to the AVD and a user can use the controller 200 to control the instance of the streaming server and the AVD, which is temporarily paired with the instance of the streaming server to display the simulation content. Play of the simulation is controlled at block 410 by a user manipulating the controller 200 to send control signals to the server 216 through the network portal 214.

Should a user desire to move physical location, the user can pause the simulation on the current location, move to a new location, and image a new information code 220 on a new AVD using the camera 204 of the controller 200 at block 412. The new AVD ID information is sent at block 414 to the server via a (typically new) network portal, causing the simulation server at block 416 to disconnect streamlining from the original AVD and commence streaming (in a pause state if desired) to the new (substitute) AVD. The server may commence play of the simulation on the new (substitute) AVD at a point in the simulation at which the simulation was stopped being streamed to the first AVD.

By not storing the user credential/preference on a screen device but rather on the portable wireless controller 200, the user is free to roam around all the AVDs he or she might wish, playing the simulation on each. For instance, a user could be playing game at a friend's TV. On the way home, the user can switch play to a tablet computer. Upon arriving home, the user can continue playing on a large TV again. A user can then decide to demo the simulation at a convention center by running an application on a computer connected to a projector, and the controller scans the Barcode/QR code.

All these screen-to-screen transition do not require additional credential input.

In addition to the above, the camera 204 on the controller 200 may be used for (temporary or permanent) provisioning to an agnostic host. It may be used for tracking, and for capturing a social moment photo with other gamers. The camera may be used as a text input interface by utilizing OCR, in which a user can write the text and scan it. The camera may be used to point to printed text such as "www.example.com" which prompts the opening of a browser window. The camera may be used for prepaid card/digital purchase code redemption by scanning a text code or bar/QR code on the AVD and associated with a product or service sought to be purchased. The camera may be used for bar code reading for online shopping, and to add an online friend by scanning a printed Text/Bar/QR code or a smart phone device screen displaying the code.

The camera may be used as an optional button, by detecting a finger/palm covering the camera. By measuring brightness registered on camera input, it can also approximate the distance between the camera and the finger covering it.

Figure 5:
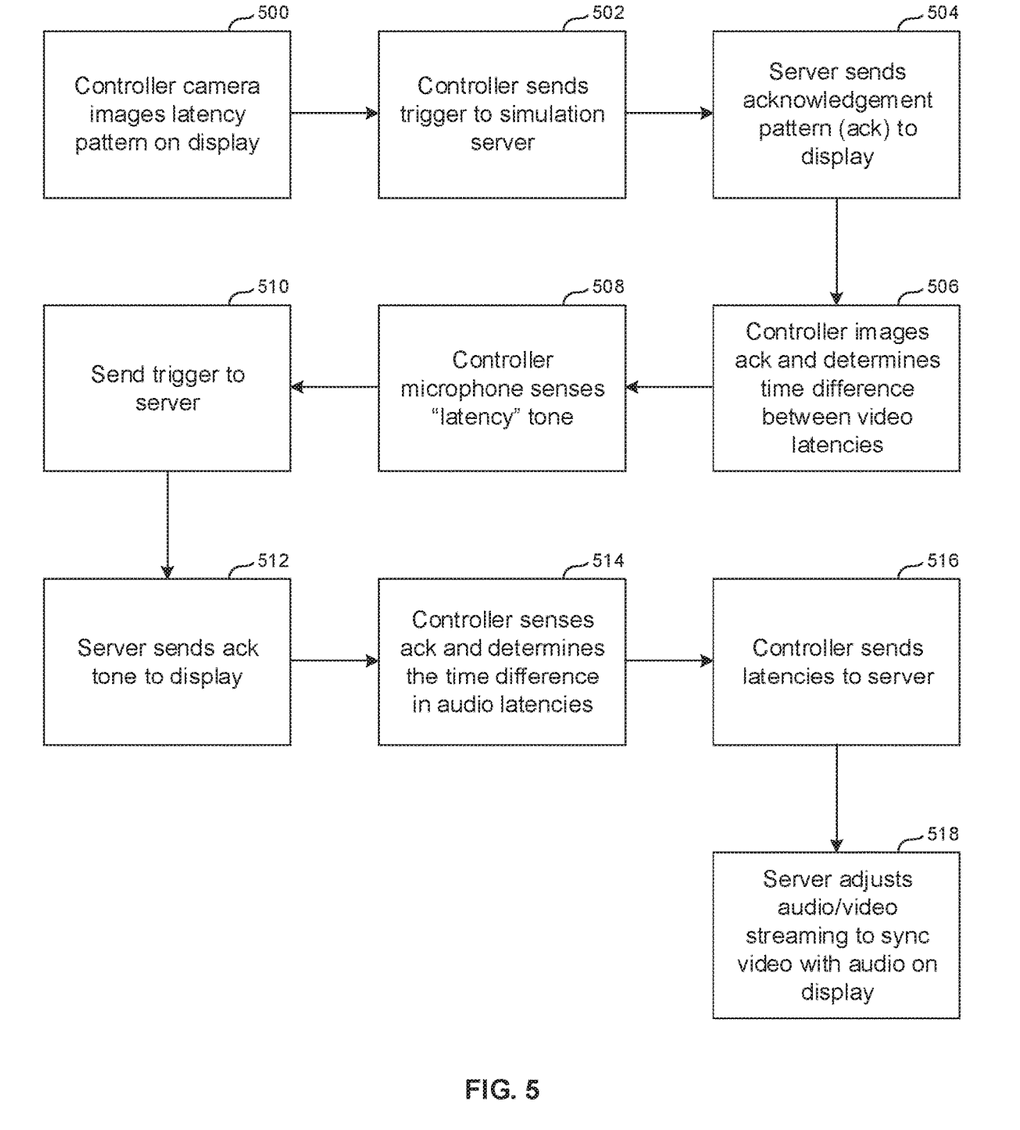
FIG. 5 is a flow chart of example logic consistent with present principles for using a wireless simulation controller to determine audio and video latency from a simulation server.

In addition the above, FIG. 5 shows that the camera 204 may be used to measure latency end-to-end. At block 500 the camera may image a latency pattern on the AVD and as soon as the processor 206 receiving the image recognizes the "pattern" on the screen, it will send trigger signal to the server at block 502. In response, at block 504 the server returns an acknowledgement pattern to the AVD, which is imaged by the camera 204 at block 506 to enable the processor 206 to calculate the time difference between, e.g., blocks 502 and 506. The "ack" pattern can be bar/QR code or simple solid color.

If desired, not only the latency of the video portion of the streaming service may be determined but also the audio portion, so that the server can adjust delays between audio and video streamlining to account for different latencies such that audio is synchronized with video at the AVD. At block 508 the microphone 205 may detect a tone correlated by the processor to a "start audio latency measurement" command. Moving to block 510, upon detection of the tone the processor sends a trigger to the server, which responds by sending an acknowledgement tone back to the AVD at block 512, which is sensed by the controller microphone at block 514 and used to determine a time differential as described above (e.g., the time difference between sending the trigger at block 510 and senses in the "ack" tone at block 514). The controller sends the audio and video latencies to the simulation server at block 516 via the network portal so that the server at block 518 may adjust audio and video streamlining of the simulation so as to synchronize audio with video when presented on the AVD.

Figure 6:
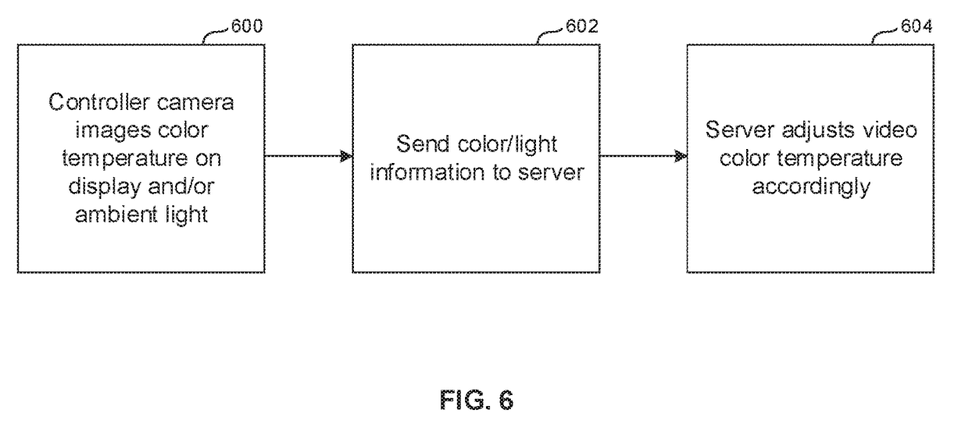
FIG. 6 is a flow chart of example logic consistent with present principles for using a wireless simulation controller to assist a simulation server in establishing a color attribute of a streamed simulation video.

FIG. 6 illustrates that the camera 204 may be used to provide the simulation server with color information from the simulation controller usable by the server to adjust a color characteristic of the simulation. This may include one or both of color calibration on the display device, and ambient color tone measurement (measure the color temperature of ambient light, bringing homogeneous or heterogeneous visual perception). Commencing at block 600, the camera 204 images the AVD which includes a representation of the color temperature of the display. In addition, or alternatively, the ambient light level adjacent the AVD may be imaged.

Moving to block 602, the ambient light and/or color temperature information is sent to the server. At block 604 the server adjusts the video according to the color temperature of the AVD and/or ambient light. For example, for low levels of ambient light, the video may be adjusted to have less contrast while under high ambient light conditions the video may be adjusted to have relatively more contrast. Yet again, for an AVD color temp that is biased toward red, the server may adjust the color temperature of the video to be biased more toward blue, while for an AVD color temp that is biased toward blue, the server may adjust the color temperature of the video to be biased more toward red, to offset the color temperature bias of the AVD.

It will be appreciated that whilst present principals have been described with reference to some example embodiments, these are not intended to be limiting, and that various alternative arrangements may be used to implement the subject matter claimed herein.

What is claimed is:

1. A system comprising: at least one processor configured with instructions to: receive at least one image from a camera of a simulation controller, the image being of a display of a display device (DD) and indicating an identification (ID) of the DD with display; send the image to a simulation server on a communication path that does not include the DD, the communication path being at least in part wireless; send user credentials stored in the controller to the simulation server; in response to the sending of the image and the credentials being valid, the server streaming a simulation to the DD, for presentation thereof on the display under control of the simulation controller.

2. The system of claim 1, wherein the server is programmed to stream the simulation to a network address of the DD indicated by the at least one image.

3. The system of claim 1, wherein the processor is implemented by the simulation controller.

4. The system of claim 1, wherein the simulation controller communicates with the simulation server via a wireless access point (AP) or router.

5. The system of claim 1, wherein the simulation controller communicates with the simulation server via a 5G controller.

6. The system of claim 1, wherein the instructions are executable to:
provide the simulation server with color information from the simulation controller usable by the simulation server to adjust a color characteristic of the simulation, the instructions being executable to:
obtain the color information from at least one color image of the DD taken by the camera;
receive from the server, responsive to color temperature in the color image being biased toward red, adjusted video of the simulation biased toward blue; and
receive from the server, responsive to color temperature in the color image being biased toward blue, adjusted video of the simulation biased toward red.

7. The system of claim 1, wherein the instructions are executable to:
image a latency pattern on the DD at a first time;
responsive to imaging the latency pattern, send a first signal to the server;
image at a second time an acknowledgement pattern sent from the server to the DD;
identify a period between the first and second times; and
send an indication of the period to the server.

8. A system comprising: at least one computer simulation controller configured to wirelessly communicate with a network portal and with at least one display device based at least in part on an identification (ID) of the display device, communication between the computer simulation controller and display device bypassing the network portal; at least one simulation server configured to communicate with the simulation controller through the network portal; the at least one display device (DD) being configured to receive at least one computer simulation from the simulation server along with control signals from the simulation server; at least one camera to image information on a display of the display device indicating ID of the display device with display, the simulation controller sending the ID to the simulation server, wherein in response to the computer simulation controller sending an image of the display indicating an ID of the DD, the simulation server streams the at least one computer simulation to the DD for presentation thereof on the display under the control of the simulation controller.

9. The system of claim 8, wherein the display device is a first display device and the system comprises a second display device, wherein the simulation controller is configured to send an ID of the second display device to the simulation server to cause the simulation to stop streaming the simulation to the first display device and start streamlining the simulation to the second display device.

10. The system of claim 9, wherein the simulation server is configured to resume play of the simulation on the second display device at a point in the simulation at which the simulation was stopped being streamed to the first display device.

11. The system of claim 8, wherein the simulation controller is configured to send user credentials to the simulation server, the credentials being stored in the simulation controller.

12. The system of claim 8, wherein the server is configured for streaming, based on the ID of the display device received from the simulation controller, a simulation to the display device for presentation thereof under control of the simulation controller responsive to the credentials being valid.

13. The system of claim 8, wherein the network portal comprises a wireless access point (AP) or router.

14. The system of claim 8, wherein the network portal comprises a 5G controller.

15. The system of claim 8, wherein the controller is configured with instructions executable to:
provide the simulation server with color information from the simulation controller usable by the simulation server to adjust a color characteristic of the simulation obtain the color information from at least one color image of the DD taken by the camera;
receive from the simulation server, responsive to color temperature in the color image being biased toward red, adjusted video of the simulation biased toward blue; and
receive from the simulation server, responsive to color temperature in the color image being biased toward blue, adjusted video of the simulation biased toward red.

16. The system of claim 8, wherein the controller is configured with instructions executable to:
image a latency pattern on the DD at a first time;
responsive to imaging the latency pattern, send a first signal to the simulation server;
image at a second time an acknowledgement pattern sent from the simulation server to the DD;
identify a period between the first and second times; and
send an indication of the period to the simulation server.

17. A method comprising: imaging a display on which a computer simulation, controlled by a simulation controller, is presentable; sending a result of the imaging to a server streaming the simulation via a network portal to pair the server with the display, the result indicating an ID of the display; receiving, in response to the sending, the simulation for play thereof on the display without the simulation passing through the network portal; controlling the display using the simulation controller by sending commands input to the simulation to the server via the network portal; and adjusting color temperature of the video of the simulation responsive to color information generated from the imaging of the display; or identifying a latency based at least in part on at least one latency pattern presented on the display; or both adjusting color temperature of the video of the simulation responsive to color information generated from the imaging of the display and identifying a latency based at least in part on at least one latency pattern presented on the display.

18. The method of claim 17, wherein the imaging is undertaken using a camera on the simulation controller.

19. The method of claim 17, wherein the imaging is undertaken using a camera on a wireless communication device paired with the simulation controller.

20. The method of claim 17, comprising sending user credentials to permit play of the simulation from the simulation controller to the server.

* * * * *